United States Patent
Akram et al.

(10) Patent No.: US 10,291,127 B2
(45) Date of Patent: May 14, 2019

(54) DYNAMIC REDUCTION OF SYNCHRONOUS RECTIFIER POWER LOSSES BASED ON AT LEAST ONE OPERATING CONDITION

(71) Applicant: MediaTek Inc., Hsin-Chu (TW)

(72) Inventors: Hasnain Akram, Burlington, MA (US); Patrick Stanley Riehl, Lynnfield, MA (US)

(73) Assignee: MediaTek Inc., Hsin-Chu (TW)

( * ) Notice: Subject to any disclaimer, the term of this patent is extended or adjusted under 35 U.S.C. 154(b) by 115 days.

(21) Appl. No.: 15/007,819

(22) Filed: Jan. 27, 2016

(65) Prior Publication Data
US 2016/0261191 A1    Sep. 8, 2016

Related U.S. Application Data

(60) Provisional application No. 62/129,115, filed on Mar. 6, 2015.

(51) Int. Cl.
| | | |
|---|---|---|
| *H02M 3/158* | (2006.01) | |
| *H02M 3/335* | (2006.01) | |
| *H02M 1/00* | (2006.01) | |

(52) U.S. Cl.
CPC ..... *H02M 3/1588* (2013.01); *H02M 3/33592* (2013.01); *H02M 2001/0009* (2013.01); *Y02B 70/1475* (2013.01)

(58) Field of Classification Search
CPC ........... H02M 3/1588; H02M 3/33592; H02M 2001/0009
See application file for complete search history.

(56) References Cited

U.S. PATENT DOCUMENTS

| | | | |
|---|---|---|---|
| 2004/0037099 A1 | 2/2004 | Nishikawa | |
| 2008/0061757 A1 | 3/2008 | Khayat et al. | |
| 2012/0257422 A1* | 10/2012 | Lee ................... | H02M 3/33523 363/21.12 |
| 2013/0182462 A1* | 7/2013 | Sorge .................... | H02M 1/083 363/21.02 |
| 2013/0182464 A1* | 7/2013 | Woias ............... | H02M 3/33507 363/21.17 |
| 2014/0085952 A1 | 3/2014 | Ptacek et al. | |
| 2014/0347027 A1* | 11/2014 | Jayaraj ................ | H02M 3/1563 323/282 |

(Continued)

FOREIGN PATENT DOCUMENTS

| | | |
|---|---|---|
| CN | 1416611 A | 5/2003 |
| CN | 102355147 A | 2/2012 |

(Continued)

OTHER PUBLICATIONS

Extended European Search Report for Application No. 16158818.1 dated Aug. 3, 2016.

*Primary Examiner* — Jue Zhang
*Assistant Examiner* — Lakaisha Jackson
(74) *Attorney, Agent, or Firm* — Wolf, Greenfield & Sacks, P.C.

(57) ABSTRACT

Methods and circuits for controlling a synchronous rectifier. An operating condition of the synchronous rectifier is detected. A voltage level applied to turn on at least one transistor of the synchronous rectifier us modified based upon the detected operating condition, to improve efficiency of the synchronous rectifier.

26 Claims, 7 Drawing Sheets

(56) References Cited

U.S. PATENT DOCUMENTS

| | | | |
|---|---|---|---|
| 2015/0155792 A1* | 6/2015 | Yonezawa | H02M 3/33592 363/21.1 |
| 2015/0340877 A1 | 11/2015 | Lin et al. | |
| 2016/0081171 A1* | 3/2016 | Ichikawa | B60Q 1/0088 315/77 |

FOREIGN PATENT DOCUMENTS

| | | |
|---|---|---|
| CN | 203416160 U | 1/2014 |
| CN | 104040452 A | 9/2014 |
| WO | WO 2014/033864 A1 | 3/2014 |

\* cited by examiner

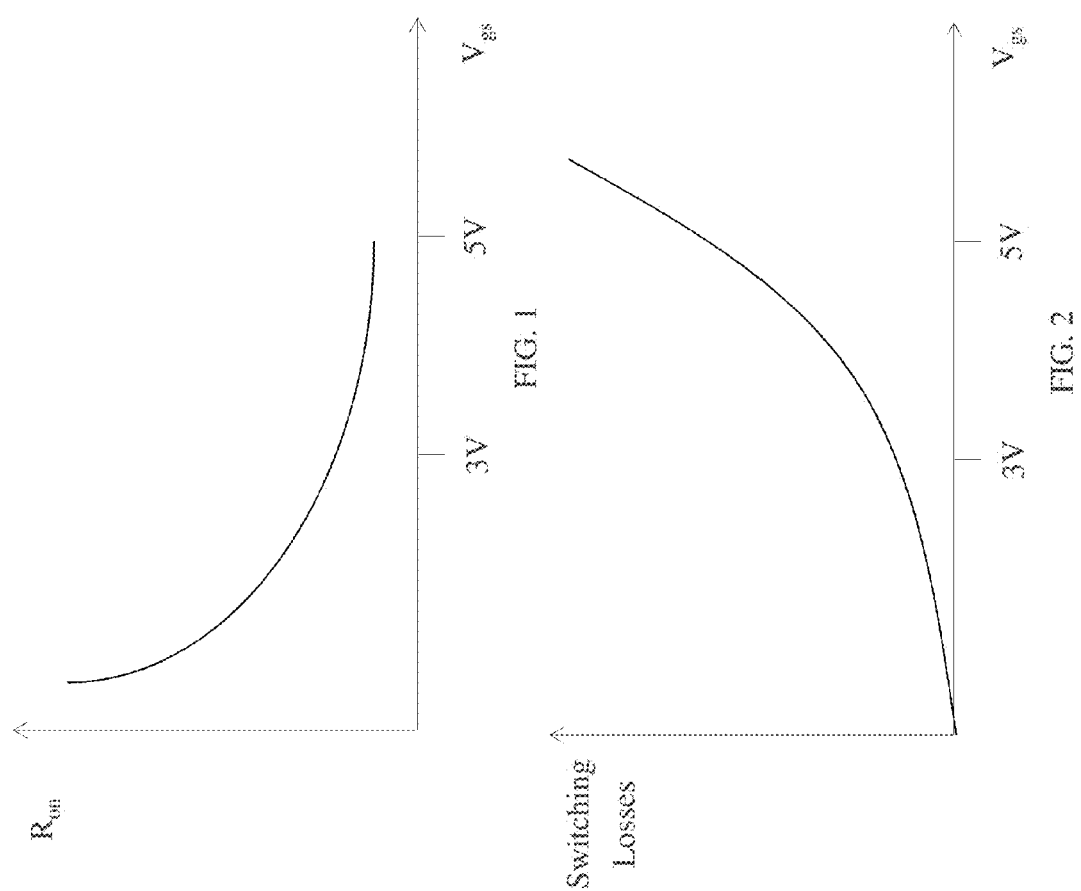

DYNAMIC REDUCTION OF SYNCHRONOUS RECTIFIER POWER LOSSES BASED ON AT LEAST ONE OPERATING CONDITION

CROSS-REFERENCE TO RELATED APPLICATIONS

This application claims priority to U.S. provisional application Ser. No. 62/129,115 titled "DYNAMIC BALANCING OF RECTIFIER LOSSES," filed Mar. 6, 2015, which is hereby incorporated by reference in its entirety.

BACKGROUND

1. Technical Field

The techniques described herein relate generally to synchronous rectifiers and specifically to modifying the drive voltage used to turn on at least one transistor of a synchronous rectifier based on one or more operating conditions of the synchronous rectifier.

2. Discussion of the Related Art

A synchronous rectifier is a rectifier implemented by transistors rather than diodes. A control circuit controls the timing of switching the transistors based on the received AC waveform to mimic the switching on and off of the diodes in a conventional rectifier. Synchronous rectifiers can have improved efficiency over rectifiers implemented by diodes due to the lower voltage drop across them during conduction.

Wireless Power Transfer Systems (WPTS) are gaining increasing popularity as a convenient way to deliver power without wires or connectors. WPTS currently under development in the industry can be separated into two major classes: magnetic induction systems and magnetic resonance (MR) systems. Both types of systems include a wireless power transmitter and a wireless power receiver. Such systems can be used to power or charge mobile battery-powered devices such as smartphones, or tablet computers, for example, among other applications.

Inductive WPTS typically operate in an allocated frequency range of several hundred kilohertz using frequency variation as a power control mechanism. MR WPTS typically operate on a single frequency using input voltage regulation to control output power. In typical applications, MR WPTS operate at a frequency of 6.78 MHz.

Several industry committees such as the Wireless Power Consortium (WPC), the Power Matters Alliance (PMA), and the Alliance for Wireless Power (A4WP) are working on developing international standards for consumer products based on wireless power transfer.

SUMMARY

Some embodiments relate to method of controlling a synchronous rectifier having a plurality of transistors. The method includes detecting at least one operating condition of the synchronous rectifier; and modifying a voltage level applied to turn on at least one transistor of the plurality of transistors, based upon the at least one operating condition, to improve efficiency of the synchronous rectifier.

Some embodiments relate to a circuit for driving a synchronous rectifier that has a plurality of transistors. The circuit includes a controller configured to detect at least one operating condition of the synchronous rectifier; and a drive circuit configured to modify a voltage level applied to turn on at least one transistor of the plurality of transistors, based upon the at least one operating condition, to improve efficiency of the synchronous rectifier.

Some embodiments relate to a circuit that includes a synchronous rectifier having a plurality of transistors; a controller configured to detect at least one operating condition of the synchronous rectifier; and a drive circuit configured to modify a voltage level applied to turn on at least one transistor of the plurality of transistors, based upon the at least one operating condition, to improve efficiency of the synchronous rectifier.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 1 shows the on-resistance of a transistor as a function of $V_{gs}$.

FIG. 2 shows the switching losses of a synchronous rectifier as a function of $V_{gs}$.

DETAILED DESCRIPTION

Figure 3:
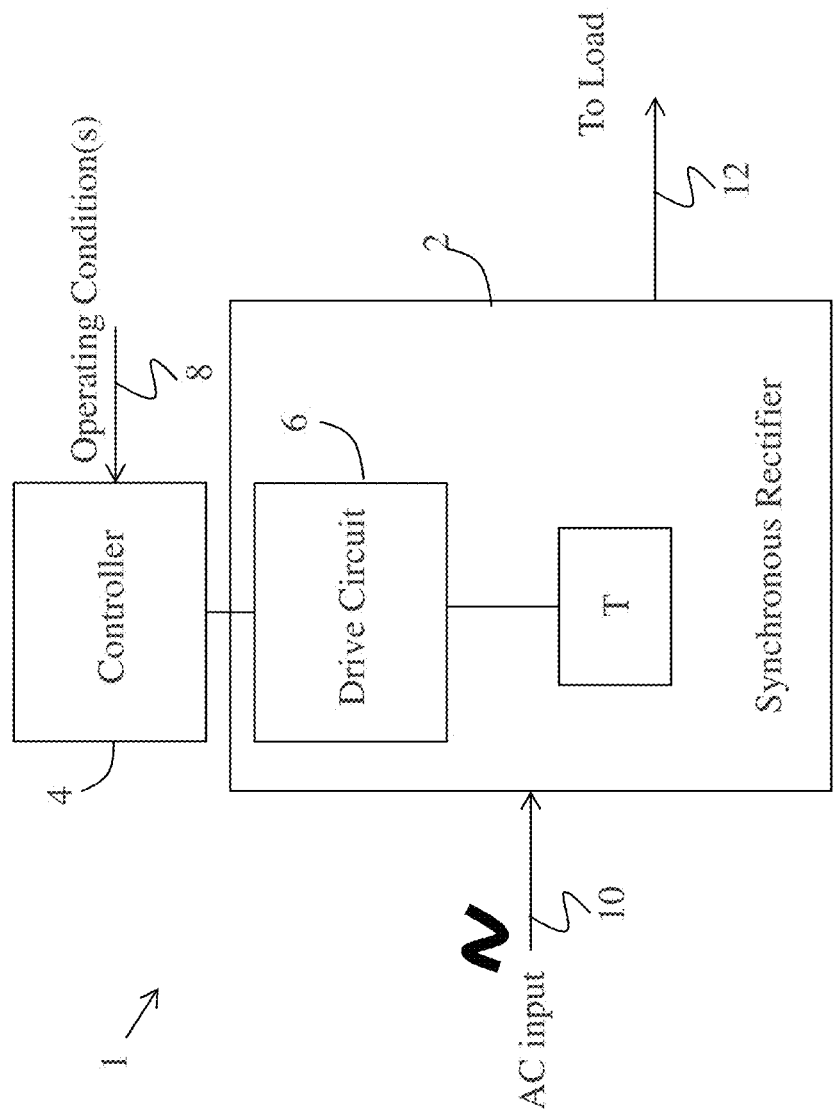
FIG. 3 shows an example of a synchronous rectifier circuit, according to some embodiments.

As discussed above, synchronous rectifiers can provide improved efficiency over rectifiers implemented with diodes. However, synchronous rectifiers still have power losses, due primarily to two different mechanisms. The first loss mechanism is conduction losses due to the on-resistance of the transistors. The resistive power loss in a transistor is equal to $I^2R$, where I is the current through the transistor and R is the on-resistance of the transistor. The second loss mechanism is switching losses. Switching losses are incurred when the parasitic capacitance (e.g., the gate-source capacitance of a MOSFET) of a transistor is charged or discharged. Switching losses are proportional to switching frequency, capacitance, and the square of the voltage (e.g., the gate-source voltage), and are equal to $fCV^2$+ (supply losses to generate V), where f is the frequency, C is the capacitance, and V is the voltage to turn on/off the transistor (e.g., the gate-source voltage $V_{gs}$). The total power losses in a synchronous rectifier are the sum of the conduction losses and the switching losses.

As shown in FIG. 1, increasing the gate-source voltage $V_{gs}$ of a MOSFET decreases its on-resistance. However, the improvement in on-resistance with increasing $V_{gs}$ eventually plateaus, such that increasing $V_{gs}$ further does not have a significant impact on the on-resistance. In the example of FIG. 1, the on-resistance of a transistor at $V_{gs}$=5V is only slightly lower than the on-resistance at $V_{gs}$=3V. FIG. 2 shows the switching losses increase at increasing $V_{gs}$. As mentioned above, the switching losses are proportional to the square of $V_{gs}$. Since conduction losses decrease with increasing $V_{gs}$ but switching losses increase with increasing $V_{gs}$, selecting $V_{gs}$ involves a tradeoff between conduction losses and switching losses.

The minimum total power losses can be achieved when the switching losses are equal to the conduction losses. However, the inventors have recognized and appreciated that even if a synchronous rectifier is designed to balance switching losses and conduction losses, changing operating conditions can shift the balance between them. For example, when the output current of the synchronous rectifier increases, conduction losses increase, which can make the conduction losses greater than the switching losses, which increases the total power losses. Conversely, when the output current decreases, conduction losses decrease, which can make conduction losses smaller than the switching losses, which increases the total power losses.

According to the techniques described herein, a synchronous rectifier may be controlled to manage power losses by re-balancing resistive and switching losses for changing operating conditions. Such operating conditions may include load conditions of the synchronous rectifier, such as output current, output voltage, output power, load impedance or resistance and other operating conditions such as synchronous rectifier temperature. In some embodiments, the synchronous rectifier can maximize efficiency by balancing resistive and switching losses based on a detected operating condition.

In some embodiments, an operating condition of the synchronous rectifier is detected, and the voltage level that drives the control terminal (e.g., the gate) of a transistor of the synchronous rectifier is modified based upon the detected operating condition. For example, a load condition such as output current may be detected and the gate-source voltage $V_{gs}$ applied to one or more transistors of the synchronous rectifier to turn them on may be modified based on the detected load condition. Accordingly, conduction losses and switching losses can be dynamically re-balanced, and total power losses reduced, in view of changing operating conditions of the synchronous rectifier. Such a technique can improve synchronous rectifier efficiency across a wide range of operating conditions.

As an example, if the load current of the synchronous rectifier increases, causing the conduction losses to be greater than the switching losses, a controller may control a drive circuit to produce an increased gate-source voltage $V_{gs}$ to drive the transistors of the synchronous rectifier. Increasing $V_{gs}$ decreases the on-resistance and lowers the conduction losses, but increases the switching losses. Conversely, if the load current decreases, causing the switching losses to be greater than the conduction losses, the controller that controls the synchronous rectifier may control the drive circuit to produce a reduced gate-source voltage $V_{gs}$. Decreasing $V_{gs}$ increases the on-resistance and the conduction losses but decreases the switching losses. Accordingly, the total power losses can be reduced or minimized dynamically based on the load current.

FIG. 3 shows an example of a synchronous rectifier circuit 1, according to some embodiments. Synchronous rectifier circuit 1 includes a synchronous rectifier 2, a controller 4 and a drive circuit 6. In operation, the synchronous rectifier 2 receives an AC input signal 10 and rectifies it to produce a rectified DC voltage 12, which may be provided to a load. The controller 4 receives information regarding at least one operating condition 8 of the synchronous rectifier. Based upon the operating condition 8, the controller 4 controls the drive circuit 6 to produce a selected voltage level to drive the control terminal of at least one transistor T of the synchronous rectifier 2. Drive circuit 6 may include multiple drive circuits. In some embodiments, drive circuit 6 may include individual drive circuits for driving each transistor. Control circuit 4 may be a single controller to control all of the drive circuits, or multiple control circuits (e.g., a control circuit for controlling each drive circuit).

Figure 4:
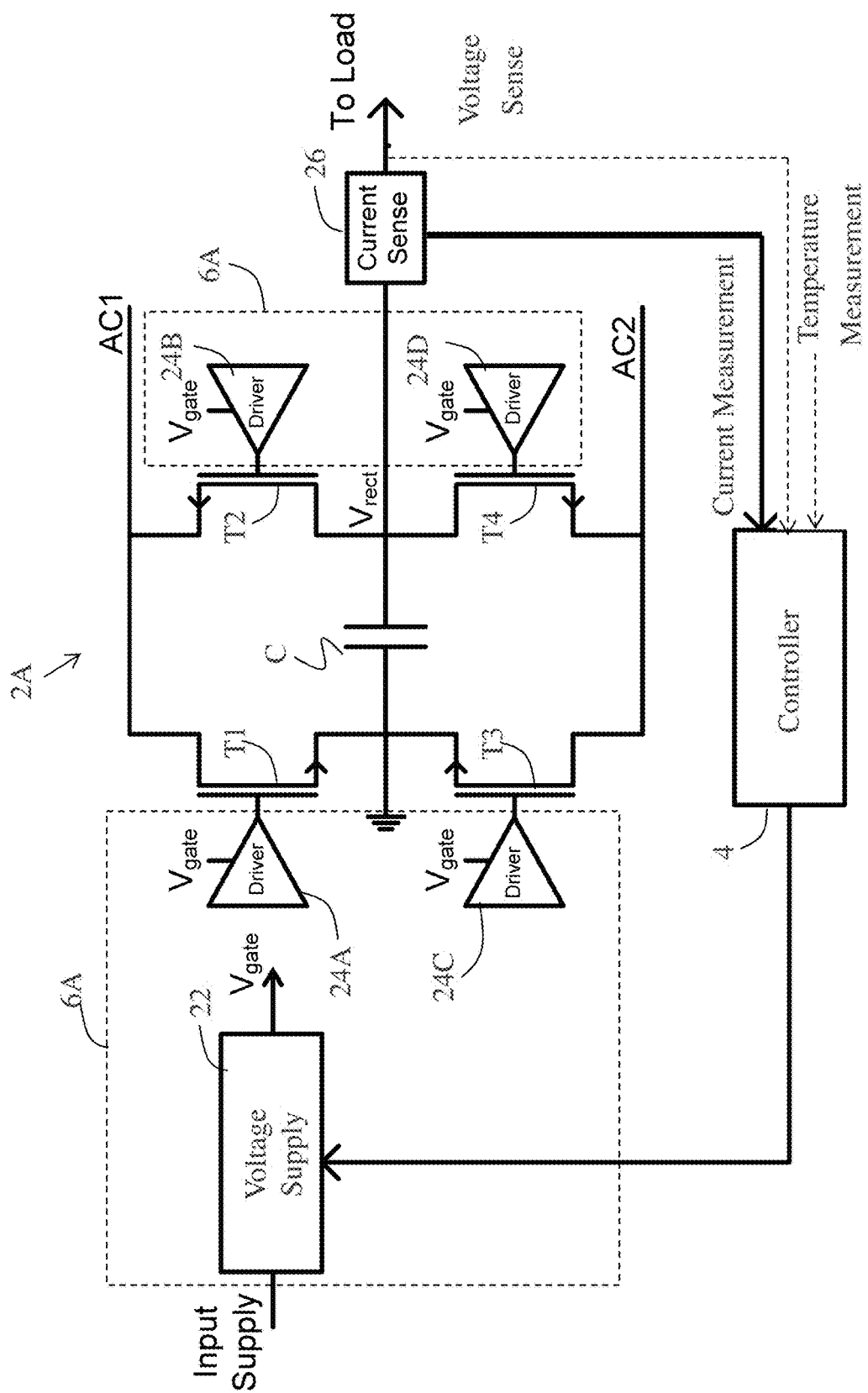
FIG. 4 shows a more detailed example of a synchronous rectifier circuit, according to some embodiments.

FIG. 4 shows a more detailed example of a synchronous rectifier circuit, according to some embodiments. Synchronous rectifier 2A of FIG. 4 is a full bridge synchronous rectifier including transistors T1-T4 and an output capacitor C. However, the techniques described herein are not limited to a full bridge circuit, as in some embodiments the synchronous rectifier may be a half-bridge circuit. In the embodiment of FIG. 4, transistors T1-T4 are n-channel MOSFETs. However, the techniques described herein are not limited to n-channel MOSFETs, as in some embodiments p-channel MOSFETS may be used, or a combination of n-channel MOSFETS and p-channel MOSFETS may be used. Further, in some embodiments transistors other than MOSFETS may be used, such as bipolar transistors, for example, as the techniques described herein are not limited to MOSFETS.

The gates of transistors T1-T4 are driven by driver circuits 24A-24D, respectively. In some embodiments, driver circuits 24A-24D may be inverters. However, any suitable driver circuits may be used. Driver circuits 24A-24D may be controlled by controller 4 to turn on and off transistors T1-T4 with a suitable timings. For example, when the AC input voltage (AC1-AC2) is positive, transistors T2 and T3 may be turned on (conductive) and transistors T1 and T4 may be turned off (non-conductive). When the AC input voltage (AC1-AC2) is negative, transistors T2 and T3 may be turned off and transistors T1 and T4 may be turned on. An n-channel MOSFET may be turned on by controlling its driver circuit to provide the supply voltage $V_{gate}$ to the gate of the transistor, and may be turned off by controlling its driver circuit to provide ground voltage (or another common mode voltage) to the gate. In embodiments where other types of transistors are used with control terminals other than a gate (e.g., a base of a bipolar transistor), the transistor is controlled by providing the supply voltage as a drive voltage to the control terminal of the transistor.

The supply voltage, $V_{gate}$, of driver circuits 24A-24D is produced by a voltage supply circuit 22 from an input supply voltage. The voltage supply circuit 22 may be a switching power converter, e.g., a DC/DC power converter, such as a buck converter, a boost converter, or any other suitable switching power converter. In some embodiments, the voltage supply circuit 22 may be a Low Drop Out (LDO) regulator. Implementing voltage supply circuit 22 as a switching power converter may result in reduced power losses as compared to implementing voltage supply circuit 22 as a LDO regulator.

Controller 4 may receive one or more signals representative of a load condition or other operating condition of the synchronous regulator 2. Controller 4 may control voltage supply circuit 22 to produce a suitable output voltage $V_{gate}$ based upon such signal(s).

As an example of a measuring a load condition, a sensor 26 may sense the output current of the synchronous rectifier 2A. Sensor 26 may be any suitable sensor for sensing a current, and may be a current sensor or a voltage sensor in combination with a current sensing resistor, by way of example. The measurement of the current sensed by sensor 26 may be provided to controller 4, which may control the voltage $V_{gate}$ produced by voltage supply circuit 22 based upon the sensed current. As another example of measuring a load condition, the output voltage of the synchronous rectifier 2A may be sensed and the measurement may be provided to controller 4, which may control the voltage $V_{gate}$ produced by voltage supply circuit 22 based upon the sensed voltage. Such load conditions are an example of an operating condition of the load. Another example of an operating condition of the synchronous rectifier 2A is temperature. A temperature sensor may sense the die temperature of the synchronous rectifier 2A and provide the measured temperature to the controller 4, which may control the voltage $V_{gate}$ produced by voltage supply circuit 22 based upon the measured temperature.

In the embodiment of FIG. 4, the transistors T1-T4 are shown as NMOS transistors that are provided with the same gate voltage $V_{gate}$ when they are turned on. However, using NMOS transistors may involve bootstrapping the driver circuits 24B and 24D to control transistors T2 and T4, which have sources that are not ground-referenced.

Figure 5:
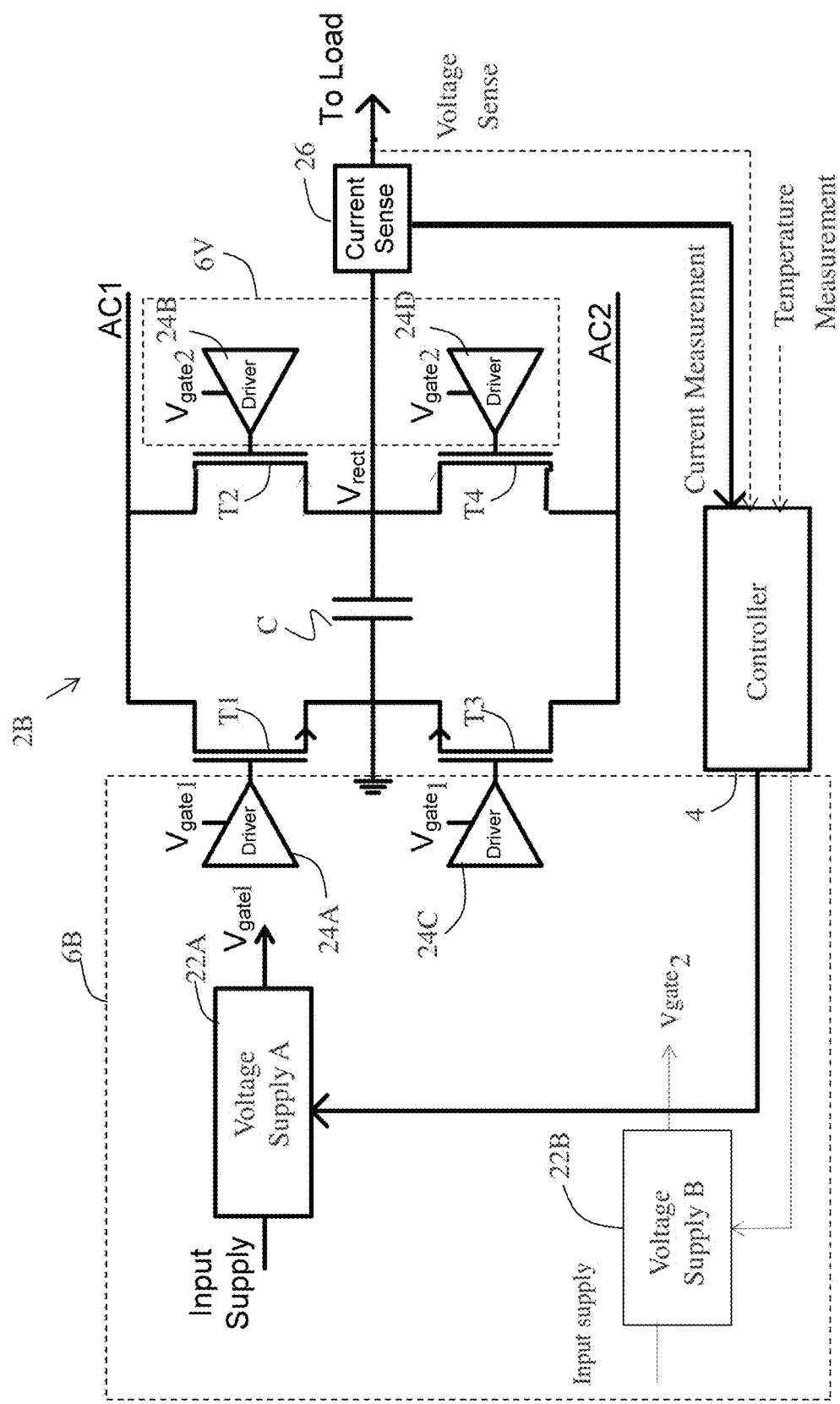
FIG. 5 shows an example of a synchronous rectifier in which transistors T2 and T4 are PMOS transistors, according to some embodiments.

FIG. 5 shows an embodiment in which transistors T2 and T4 of the synchronous rectifier 2B are PMOS transistors, which may avoid a need for bootstrapped gate driver circuits referenced to the AC input. In the embodiment of FIG. 5, a second voltage supply circuit 22B is provided to supply a second gate voltage $V_{gate2}$ to drive the PMOS transistors T2 and T4. As discussed above, voltage supply circuits 22A and 22B may be implemented as switching power converters or LDO regulators. Controller 4 may control both the voltage supply circuits 22A and 22B of drive circuit 6B.

Figure 6:
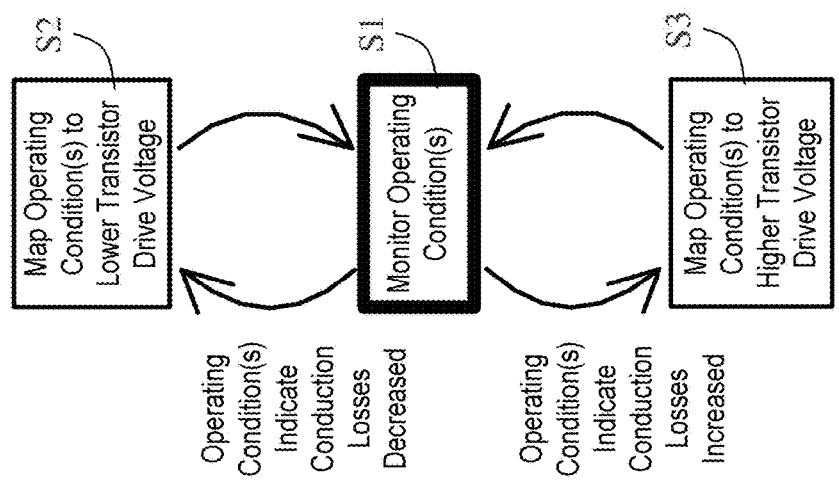
FIG. 6 shows a flowchart of a method of controlling a drive voltage of a synchronous rectifier by mapping one or more detected operating conditions to a drive voltage, according to some embodiments.

FIG. 6 shows a flowchart of an exemplary method of controlling a drive voltage of a synchronous rectifier by mapping one or more detected operating conditions to a drive voltage using an open loop control technique, according to some embodiments.

In step S1, one or more operating conditions of the synchronous rectifier are monitored. For example, the output current of the rectifier may be monitored. If the output current decreases, indicating decreased conduction losses, the transistor drive voltage of the synchronous rectifier (e.g., the gate-source voltage $V_{gs}$) may be lowered in step S2. In some embodiments, the transistor drive voltage may be determined by the controller 4 based upon one or more operating conditions of the rectifier, such as measured rectifier output current, output voltage, output load impedance, output power, or rectifier temperature, for example. Any suitable mapping between operating condition(s) and transistor drive voltage may be used to determine the transistor drive voltage to be applied. In some embodiments, the mapping may be stored in a lookup table. The lookup table may take one operating condition as an input (e.g., rectifier output current, output voltage, output power or temperature), or may take a plurality of operating conditions as inputs (e.g., two or more of rectifier output current, output voltage, output load impedance and temperature), such as two operating conditions, three operating conditions or a greater number of operating conditions. In some embodiments controller, 4 may store a lookup table of predetermined settings of transistor drive voltages (e.g., gate-source voltages $V_{gs}$) over a range of one or more operating conditions. As another example, controller 4 may be programmed with a function (e.g., an equation) that can be used to calculate suitable transistor drive voltages based upon one or more operating conditions. The controller 4 then controls voltage supply circuit(s) 22A and/or 22B to produce the determined transistor drive voltages for the driver circuits. The method may then return to step S1, and the operating condition(s) of the synchronous rectifier may be monitored. If the output current increases, the transistor drive voltage may be raised in step S3. A new transistor drive voltage may be determined based upon any one or more operating conditions, as discussed above. The method may then return to step S1.

After returning to step S1, either step S2 or S3 may be performed depending upon the direction of the change in the operating condition(s). In embodiments where other types of transistors are used with control terminals other than a gate (e.g., a base of a bipolar transistor), the transistor drive voltage may be referred to by a different term (e.g., base voltage), rather than $V_{gs}$.

Figure 7:
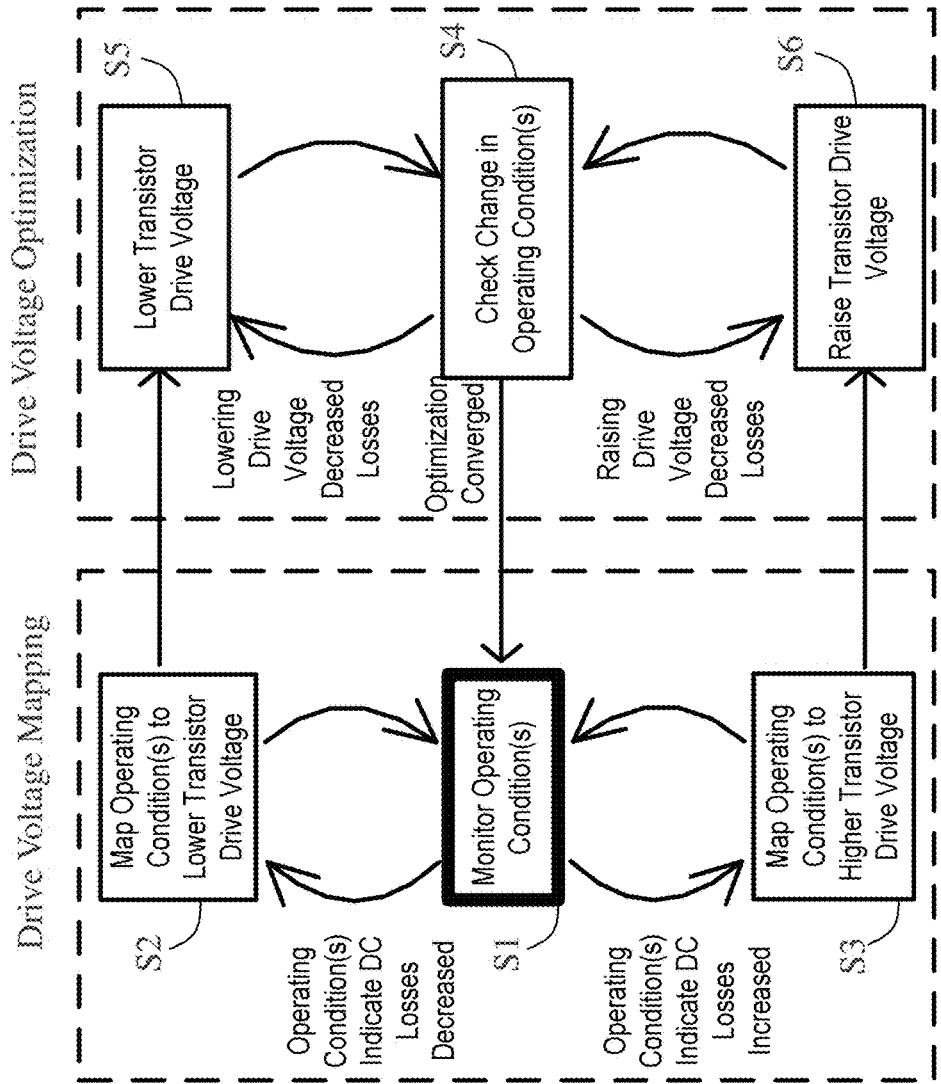
FIG. 7 shows a flowchart of a method of controlling a drive voltage of a synchronous rectifier based upon mapping one or more detected operating conditions to select an initial drive voltage and using an optimization algorithm to converge on a drive voltage that maximizes or otherwise improves efficiency.

FIG. 7 shows a flowchart of a method of controlling a drive voltage of a synchronous rectifier based upon mapping one or more detected operating conditions to select an initial drive voltage and using an optimization algorithm to converge on a drive voltage that maximizes or otherwise improves efficiency.

Steps S1-S3 may be the same as discussed above with respect to FIG. 6. In the method of FIG. 7, a drive voltage optimization may be performed for the detected operating condition(s) starting with the transistor drive voltage determined by the mapping in steps S2 or S3. In some embodiments, the optimization may be performed based upon sensed temperature, and the transistor drive voltage may be modified in steps S4-S6 until the optimization converges on a transistor drive voltage that results in the lowest operating temperature.

For example, after selecting a lower transistor drive voltage determined by mapping in step S2, the transistor drive voltage may be lowered by a small amount in step S5. The rectifier temperature may be checked in step S4. If the rectifier temperature decreased, the transistor drive voltage may be decreased again (e.g., by an incremental amount) in step S5. Steps S4-S5 may be repeated until the optimization converges on the transistor drive voltage that results in the lowest operating temperature. At some point, when decreasing the transistor drive voltage further causes the temperature to increase, the drive voltage may be increased in step S6 and a determination is made that the optimization has converged, and the method may proceed back to step S1. Alternatively, lowering the transistor drive voltage determined in step S2 may cause the temperature to increase from the outset, in which case steps S6 and S4 may be repeated to raise the transistor drive voltage until the temperature converges at a minimum, and the method may then proceed back to step S1.

Similarly, after selecting a higher transistor drive voltage by mapping in step S3, the transistor drive voltage may be raised by a small amount in step S6. If the rectifier temperature decreases, the transistor drive voltage may be increased again (e.g., by an incremental amount) in step S6. Steps S4 and S6 may be repeated until the optimization converges on the transistor drive voltage that results in the lowest operating temperature. At some point, when increasing the transistor drive voltage further causes the temperature to increase, the drive voltage may be reduced to the previous value, and a determination is made that the optimization has converged, and the method may proceed back to step S1. Alternatively, raising the transistor drive voltage determined in step S6 may cause the temperature to increase from the outset, in which case steps S5 and S4 may be repeated to lower the transistor drive voltage until the temperature converges at a minimum, and the method may then proceed back to step S1.

Any suitable optimization algorithm may be used. Above has been described an example of a "hill-climbing" algorithm that makes small perturbations in the transistor drive voltage until it converges on an optimal operating condition (e.g., a minimum measured temperature). However, the techniques described herein are not limited to a hill-climbing optimization algorithm, as any other suitable optimization algorithm may be used.

A synchronous rectifier that has a transistor drive voltage controlled based upon an operating condition of the synchronous rectifier may be used advantageously in a wireless power transfer system to improve efficiency across operating conditions. For example, such a synchronous rectifier may be used in a wireless power receiver to rectify a received AC signal with high efficiency.

Figure 8:
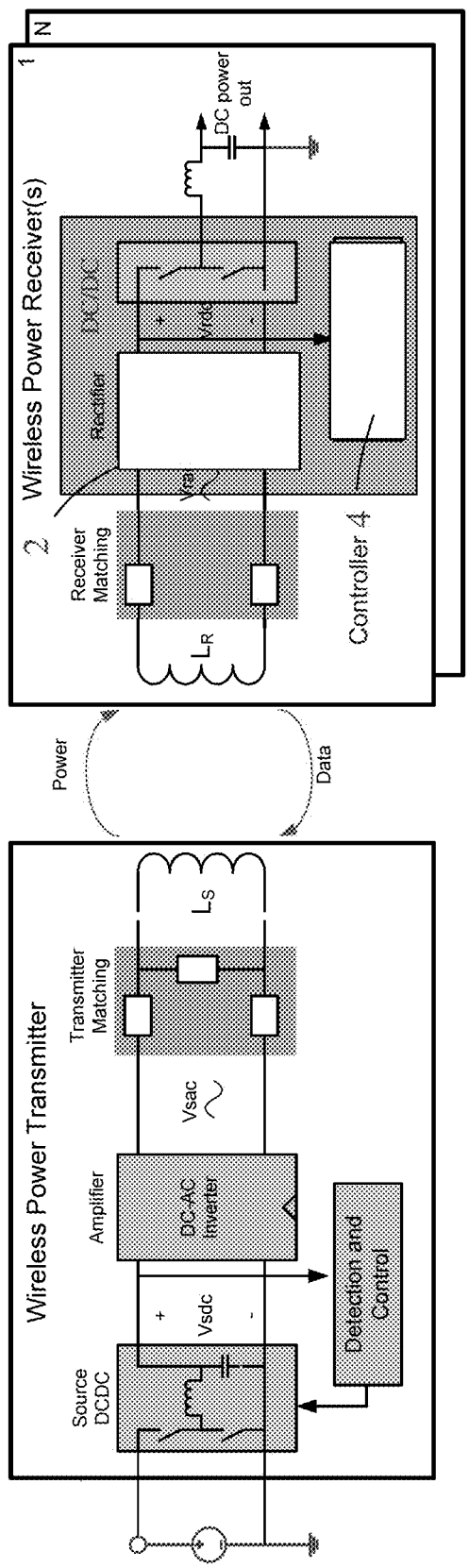
FIG. 8 shows a power chain for a wireless power system in which a wireless power receiver has a synchronous rectifier.

FIG. 8 shows a power chain for a wireless power transfer system with a wireless power receiver having a synchronous rectifier 2, according to some embodiments. The wireless power transmitter receives a voltage from a DC adapter. The adapter voltage is scaled by a DC/DC converter and applied to a DC-AC inverter. The inverter, in conjunction with the transmitter matching network, generates an AC current in the transmit coil. The AC current in the transmit coil generates an oscillating magnetic field in accordance with Ampere's law. The oscillating magnetic field induces an AC voltage into a tuned receiver coil of a wireless power receiver in accordance with Faraday's law. The AC voltage induced in the receiver coil may be received by a synchronous rectifier 2 that generates a DC voltage. The DC voltage may be regulated using a DC/DC converter. The output of the DC/DC converter may be filtered and provided to a load. In this example, the controller 4 may be a controller that controls the wireless power receiver.

Controller 4 as described herein may be implemented by any suitable type of circuitry, using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above. The controller 4 may store information mapping detected operating condition(s) to a predetermined gate-source voltage $V_{gs}$. As an example, controller 4 may store a look-up table. Such information may be stored in any suitable type of memory such as nonvolatile or volatile memory, such as RAM, ROM, EEPROM, or any other type of computer-readable storage.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of controlling a synchronous rectifier having a plurality of transistors, the method comprising:
    turning on at least one transistor of the plurality of transistors by applying a first voltage level to the at least one transistor;
    detecting at least one operating condition of the synchronous rectifier; and
    turning on the at least one transistor of the plurality of transistors by applying a second voltage level to the at least one transistor, the second voltage level being different from the first voltage level, wherein the second voltage level is determined based upon the at least one operating condition,
    wherein the second voltage level is set to reduce a sum of switching losses and conduction losses of the synchronous rectifier.

2. The method of claim 1, wherein the at least one operating condition comprises at least one of the following:
    an output current of the synchronous rectifier,
    an output voltage of the synchronous rectifier,
    an output power of the synchronous rectifier,
    a load impedance or resistance of the synchronous rectifier, and
    a temperature of the synchronous rectifier.

3. The method of claim 1, further comprising determining the second voltage level at least in part by looking up a voltage level in a lookup table using the at least one operating condition.

4. The method of claim 1, further comprising determining the second voltage level at least in part by calculating a voltage level as a function of the at least one operating condition.

5. The method of claim 1, further comprising determining the second voltage level at least in part by optimizing the second voltage level based on the at least one operating condition.

6. The method of claim 1, further comprising determining the second voltage level at least in part by:
    mapping at least a first operating condition to a mapped voltage level; and
    determining the second voltage level based on at least a second operating condition, using the mapped voltage level.

7. The method of claim 6, wherein determining the second voltage level is performed using a hill climbing algorithm.

8. The method of claim 1, wherein the at least one operating condition comprises an output current of the synchronous rectifier.

9. The method of claim 8, wherein when the output current of the synchronous rectifier increases, the second voltage level is set higher than the first voltage level, wherein the first voltage level is applied prior to applying the second voltage level.

10. The method of claim 9, wherein, when the output current of the synchronous rectifier decreases, the second voltage level is set lower than the first voltage level, wherein the first voltage level is applied prior to applying the second voltage level.

11. The method of claim 1, wherein the at least one operating condition comprises a temperature of the synchronous rectifier.

12. The method of claim 11, wherein the second voltage level is determined based on the temperature of the synchronous rectifier.

13. The method of claim 1, wherein the at least one operating condition comprises an output current of the synchronous rectifier and a temperature of the synchronous rectifier, and the method further comprises determining the second voltage level at least in part by:
   mapping the output current to a mapped voltage level; and
   determining the second voltage level based on at least a second operating condition, using the mapped voltage level.

14. The method of claim 1, wherein the second voltage level applied to turn on at least one transistor is a gate-source voltage.

15. A circuit, comprising,
   a synchronous rectifier having a plurality of transistors;
   a controller configured to detect at least one operating condition of the synchronous rectifier; and
   a drive circuit configured to turn on at least one transistor of the plurality of transistors by applying a first voltage level to the at least one transistor, and subsequently turn on the at least one transistor of the plurality of transistors by applying a second voltage level to the at least one transistor, the second voltage level being different from the first voltage level, wherein the second voltage level is determined based upon the at least one operating condition,
   wherein the drive circuit is configured to set the second voltage level to reduce a sum of switching losses and conduction losses of the synchronous rectifier.

16. A circuit for driving a synchronous rectifier, the synchronous rectifier having a plurality of transistors, the circuit comprising:
   a controller configured to detect at least one operating condition of the synchronous rectifier; and
   a drive circuit configured to turn on at least one transistor of the plurality of transistors by applying a first voltage level to the at least one transistor, and subsequently turn on the at least one transistor of the plurality of transistors by applying a second voltage level to the at least one transistor, the second voltage level being different from the first voltage level, wherein the second voltage level is determined based upon the at least one operating condition,
   wherein the second voltage level is set to reduce a sum of switching losses and conduction losses of the synchronous rectifier.

17. The circuit of claim 16, wherein the drive circuit is a first drive circuit, and the at least one transistor is at least one first NMOS transistor, and the circuit further comprises:
   a second drive circuit configured to modify a voltage level applied to turn on at least one second transistor of the plurality of transistors, based upon the at least one operating condition, the at least one second transistor being a PMOS transistor.

18. The circuit of claim 16, wherein the drive circuit comprises a switching power converter.

19. The circuit of claim 16, wherein the drive circuit comprises a low-drop-out regulator.

20. The circuit of claim 16, wherein the at least one operating condition comprises at least one of the following:
   an output current of the synchronous rectifier,
   an output voltage of the synchronous rectifier,
   an output power of the synchronous rectifier,
   a load impedance or resistance of the synchronous rectifier, and
   a temperature of the synchronous rectifier.

21. The circuit of claim 16, wherein the controller is configured to determine the second voltage level at least in part by looking up a voltage level in a lookup table using the at least one operating condition.

22. The circuit of claim 16, wherein the controller is configured to determine the second voltage level at least in part by calculating a voltage level as a function of the at least one operating condition.

23. The circuit of claim 16, wherein the controller is configured to determine the second voltage level at least in part by optimizing the second voltage level based on the at least one operating condition.

24. The circuit of claim 16, wherein the controller is configured to determine the second voltage level at least in part by:
   mapping at least a first operating condition to a mapped voltage level; and
   determining the second voltage level based on at least a second operating condition, using the mapped voltage level.

25. The circuit of claim 24, wherein the first operating condition is an output current of the synchronous rectifier.

26. The circuit of claim 24, wherein the second operating condition is a temperature of the synchronous rectifier.

* * * * *